Figure 1:
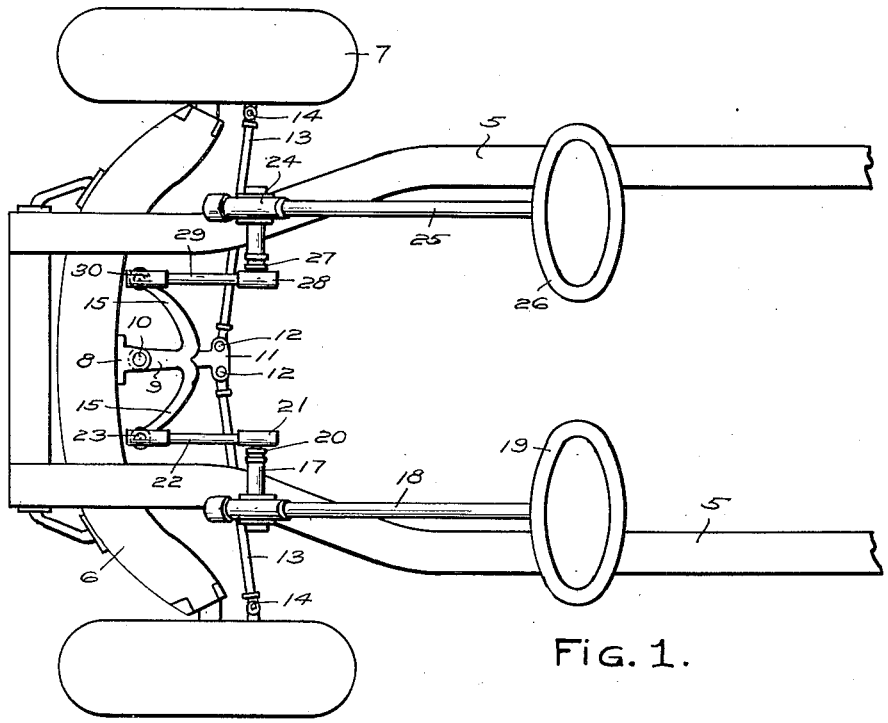

May 23, 1950  A. L. RICE  2,508,686

DUAL STEERING MECHANISM

Filed March 30, 1949

INVENTOR.
ADRIAN L. RICE,
BY
ATTORNEY.

Patented May 23, 1950

2,508,686

UNITED STATES PATENT OFFICE 2,508,686

DUAL STEERING MECHANISM

Adrian L. Rice, Miami, Fla.

Application March 30, 1949, Serial No. 84,270

2 Claims. (Cl. 280—95)

This invention relates to an improvement in steering mechanism for motor vehicles and has particular reference to a steering mechanism having dual control means for the ground wheels of the vehicle.

It is an object of the present invention to provide a common pitman arm for operative connection to the ground wheels and having connection with either of two separate steering gears to be manually actuated from either side of the vehicle.

Dual controls for motor vehicles employed for driver instruction purposes are well known in the art, but heretofore, it has been difficult to conveniently install a separate steering gear and associate parts including a steering column and hand wheel and a drag link to the steering pitmans without relatively costly linkage and the difficulty of finding sufficient clearance for the necessary linkage motion. Further, the installation of dual steering has placed unnecessary strain upon the conventional pitmans and drag links.

The purpose of this invention is to utilize a steering pitman located centrally of the center line of the vehicle, whereby the drag links will be of equal length and an even pressure exerted upon the links during their full travel and to so construct the steering pitman as to present an equal steering link connection to the steering gears upon opposite sides of the vehicle center line and which will exert an identical steering pressure to the drag links under the influence of the manually operated hand steering wheel from either the right or the left hand side of the vehicle.

A further object of the invention is the provision of a relatively simple and inexpensive pitman that is exceptionally strong, may be readily substituted for the conventional center mounted pitman with a minimum of effort, where a vehicle is to be equipped for driver instruction purposes and is highly efficient.

Other advantages of the invention will be readily apparent during the course of the following description, reference being had to the accompanying drawings wherein is shown a preferred embodiment of the invention.

Figure 2:
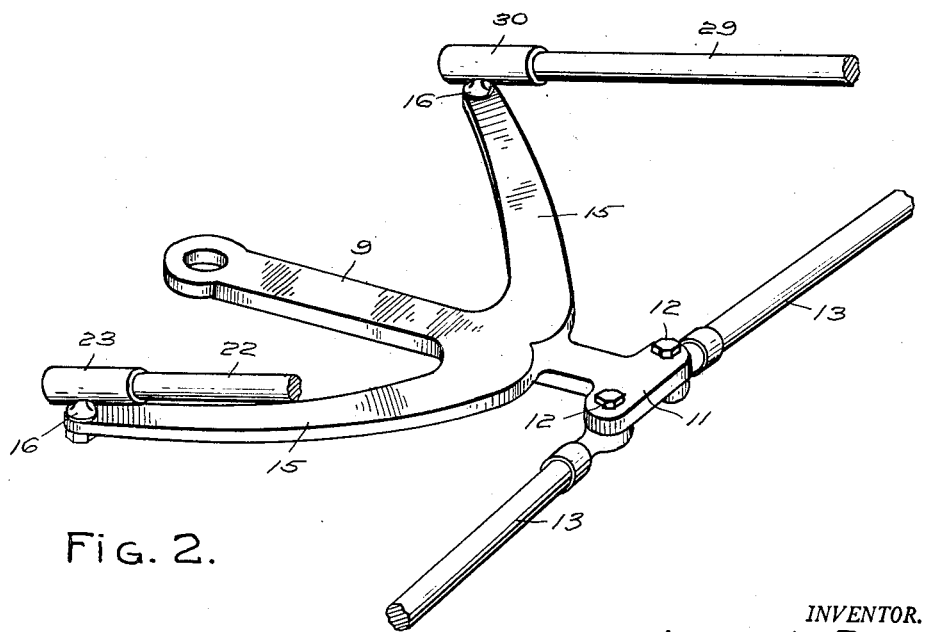

Referring to the drawings:

Figure 1 is a plan view of the front end of a vehicle chassis showing the improved dual steering mechanism, and Figure 2 is a perspective view of the improved steering pitman.

Referring specifically to the drawings by reference characters, the numeral 5 designates a vehicle chassis, having a front flexible wheel mounting 6 of conventional character for supporting steerable ground wheels 7.

Pivotally supported, through the medium of a bracket 8, is a steering pitman 9. The bracket 8 is mounted rigidly to the wheel mounting structure 6 at a point centrally of the vehicle, with the pitman extending rearwardly in a horizontal plane and pivotally supported to swing in a horizontal plane by a pin 10. The pitman 9, at its rear extremity is provided with a head portion 11, apertured for the reception of pivot pins 12, having swivel connection with identical drag links 13. The links 13 are pivotally connected to the wheel knuckles in the usual manner, at 14. Obviously, movement of the pitman to either side will result in steering motion to the ground wheels 7.

For purposes of dual steering, the pitman is provided with a pair of oppositely extending arms 15, curving outwardly and forwardly and inclined above the horizontal face of the pitman. The arms 15 are preferably formed integral with the pitman 9 and their outer extremities are apertured for the reception of a ball connection 16.

Located on the left, or driver side of the vehicle and rigidly bolted or riveted to the chassis frame 5, is a conventional steering gear housing 17, hereinafter referred to as the primary steering gear. The housing has connected thereto the usual steering column 18, having mounted at its upper end a hand steering wheel 19. The steering gear, not shown, operates the usual steering arm 20, in turn having a ball and socket connection 21, with a steering link 22. The link 22, has connection at its opposite end 23, with the ball connection 16 of the arm 15. Mounted upon the opposite side of the vehicle in a corresponding position upon the chassis 5, is a second or auxiliary steering gear housing 24, supporting steering gearing, not shown and having connection with a steering column 25, having mounted at its upper end, a hand steering wheel 26. The gearing operates a steering arm 27, having ball and socket connection at 28, with a steering link 29. The link 29 has a ball and socket connection at 30 with the ball mounting 16 upon the opposite pitman arm 15.

Since this dual steering arrangement is primarily for driver instruction, it will be apparent, that the student driver will assume the driving position upon the left hand side of the vehicle and will control the direction of the vehicle through the medium of the primary steering mechanism from the hand wheel 19. Motion will be imparted from the wheel 19 through the medium of the gearing 17 and link 22 to one arm 15 of the pitman, causing the pitman to swing in a horizontal plane and impart steering motion to the ground wheels 7 through the medium of the links 13. Since the instructor will assume a position upon the right side of the vehicle, he will have full steering control of the vehicle through the medium of the hand wheel 26, gearing 24, link 29, to the opposite arm 15 of the pitman. Thus, the improved pitman, controllable under the influence of either the primary or the auxiliary steering wheel, may be moved in an identical manner by either the student or the instructor with identical ease of steering and identical pressure exerted upon the drag links 13.

It will be apparent, that a very novel and highly desirable form of steering pitman has been provided for operation in a dual manner by identical steering devices. The pitman readily adapts itself to steering systems that permit of a center mounting, thus equalizing stress and strain upon the mechanisms and maintaining full control of the vehicle at all times.

It is to be understood, that the invention is not limited to the precise form shown, but that certain changes in the shape, size and arrangement of parts may be resorted to without departing from the spirit of the invention or the scope of the subjoined claims.

Having described my invention, what I claim as new and desire to secure by Letters Patent is:

1. Dual steering mechanism for motor vehicles having a chassis and steerable ground wheels, comprising a primary and an auxiliary steering gear supported on the chassis upon opposite sides of the vehicle, hand steering wheels for manually controlling the gears, said vehicle having a cross wheel mounting, a steering pitman pivotally supported on the cross mounting centrally of the vehicle to swing in a horizontal plane, divergent arms carried by the pitman, drag links pivotally connected with the pitman and the ground wheels, steering links pivotally connected with the gearing and with the divergent arms upon opposite sides of the pitman, said steering links adapted to independently swing the pitman from side to side under the influence of the hand steering wheels, said drag links being of equal length and said steering links being of equal length, said steering gears serving to impart equal steering pressure upon the pitman.

2. In a dual steering mechanism for motor vehicles having a chassis and steerable ground wheels and primary and auxiliary steering gears upon opposite sides thereof, the said vehicle having a cross wheel mounting for the steerable wheels, a steering pitman that is pivotally supported on the cross mounting centrally of the vehicle to swing in a horizontal plane, the pitman at its free end provided with a head portion having oppositely extending pivotal connections for wheel connected drag links of identical length, the said pitman inwardly of the head portion provided with a pair of rearwardly extending divergent arms curved throughout their length and terminating at an elevation above the pitman, the terminal ends of the divergent arms having pivotal connection with steering links operable by the primary and auxiliary steering gears.

ADRIAN L. RICE.

REFERENCES CITED

The following references are of record in the file of this patent:

UNITED STATES PATENTS

| Number | Name | Date |
|---|---|---|
| 938,783 | Palmer | Nov. 2, 1909 |
| 1,920,651 | Mackenzie | Aug. 1, 1933 |
| 2,153,498 | Broulhiet | Apr. 4, 1939 |
| 2,154,558 | Beemer | Apr. 18, 1939 |
| 2,334,702 | Newton | Nov. 23, 1943 |
| 2,406,261 | Sprinkle | Aug. 20, 1946 |

FOREIGN PATENTS

| Number | Country | Date |
|---|---|---|
| 204,340 | Great Britain | Feb. 28, 1924 |